US012286938B2

(12) United States Patent
Clyburn et al.

(10) Patent No.: US 12,286,938 B2
(45) Date of Patent: Apr. 29, 2025

(54) CONTROL SYSTEM FOR REGULATING A GASEOUS FUEL SUPPLY TO AN ENGINE AT A WELLBORE

(71) Applicant: Halliburton Energy Services, Inc., Houston, TX (US)

(72) Inventors: Andrew Silas Clyburn, Duncan, OK (US); Adam Lynn Marks, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/243,327

(22) Filed: Sep. 7, 2023

(65) Prior Publication Data

US 2025/0084801 A1 Mar. 13, 2025

(51) Int. Cl.
*F02D 41/00* (2006.01)
*F02D 41/30* (2006.01)
*F02D 41/22* (2006.01)

(52) U.S. Cl.
CPC ..... *F02D 41/0027* (2013.01); *F02D 41/3005* (2013.01); *F02D 2041/224* (2013.01); *F02D 2200/0602* (2013.01); *F02D 2200/0611* (2013.01)

(58) Field of Classification Search
CPC .. F02D 19/06; F02D 19/0613; F02D 19/0615; F02D 19/0639; F02D 19/08; F02D 19/081; F02D 2041/224; F02D 2200/0611; F02D 41/0027; F02D 41/3005; F02D 2200/0602
USPC ................................ 123/575, 576, 577, 578
See application file for complete search history.

(56) References Cited

U.S. PATENT DOCUMENTS

| | | | | |
|---|---|---|---|---|
| 7,442,239 | B2 | 10/2008 | Armstrong et al. | |
| 8,181,636 | B2 * | 5/2012 | Stockhausen | F02D 19/0644 123/577 |
| 2010/0030451 | A1 * | 2/2010 | Lippa | F02D 19/0665 123/445 |
| 2015/0046065 | A1 * | 2/2015 | Guido | F02D 41/0027 701/104 |
| 2015/0101566 | A1 * | 4/2015 | Leone | F02D 19/081 123/304 |
| 2017/0320498 | A1 * | 11/2017 | Miller | B60W 10/06 |
| 2020/0003137 | A1 * | 1/2020 | Pedder | F02D 19/081 |
| 2022/0389799 | A1 * | 12/2022 | Mao | E21B 43/2607 |

* cited by examiner

*Primary Examiner* — Sizo B Vilakazi
(74) *Attorney, Agent, or Firm* — Kilpatrick Townsend & Stockton, LLP

(57) ABSTRACT

A gaseous fuel supply for an engine at a wellbore can be regulated using a control system. The control system can include a processing device communicatively coupled to one or more sensors to receive a fuel property measurement from the one or more sensors. The fuel property measurement can correspond to a first fuel source of the engine that can be used as the fuel supply for the engine to power an equipment to perform a wellsite operation. Additionally, the processing device can identify a predefined range of the fuel supply that corresponds to a target performance level of the engine. Based on the fuel property measurement, the processing device can determine that the first fuel source is outside of the predefined range. In response, the processing device can provide a second fuel source as the fuel supply. The second fuel source can enable the engine to operate at the target performance level.

18 Claims, 5 Drawing Sheets

CONTROL SYSTEM FOR REGULATING A GASEOUS FUEL SUPPLY TO AN ENGINE AT A WELLBORE

TECHNICAL FIELD

The present disclosure relates generally to wellbore drilling operations and, more particularly (although not necessarily exclusively), to a control system for regulating a gaseous fuel supply to an engine at a wellbore.

BACKGROUND

Performing operations, such as drilling or completion operations, at a wellsite entails various steps, each using a number of wellsite equipment. For instance, at the wellsite, there may be various fracturing equipment on location that require power. Often, each wellsite equipment can be powered by an engine consuming gaseous fuel. The various wellsite equipment may rely on diesel engines or dual-fuel engines that consume a mixed fuel containing natural gas and diesel for power. The various wellsite equipment can be damaged or fail when the gaseous fuel flowing to the engines from a fuel source, such as from a fuel tank or hydrocarbon-producing wellbore, is outside of a predefined range specific to the piece of wellsite equipment. Equipment failure can lead to a loss of well control or other hazards.

DETAILED DESCRIPTION

Figure 1:
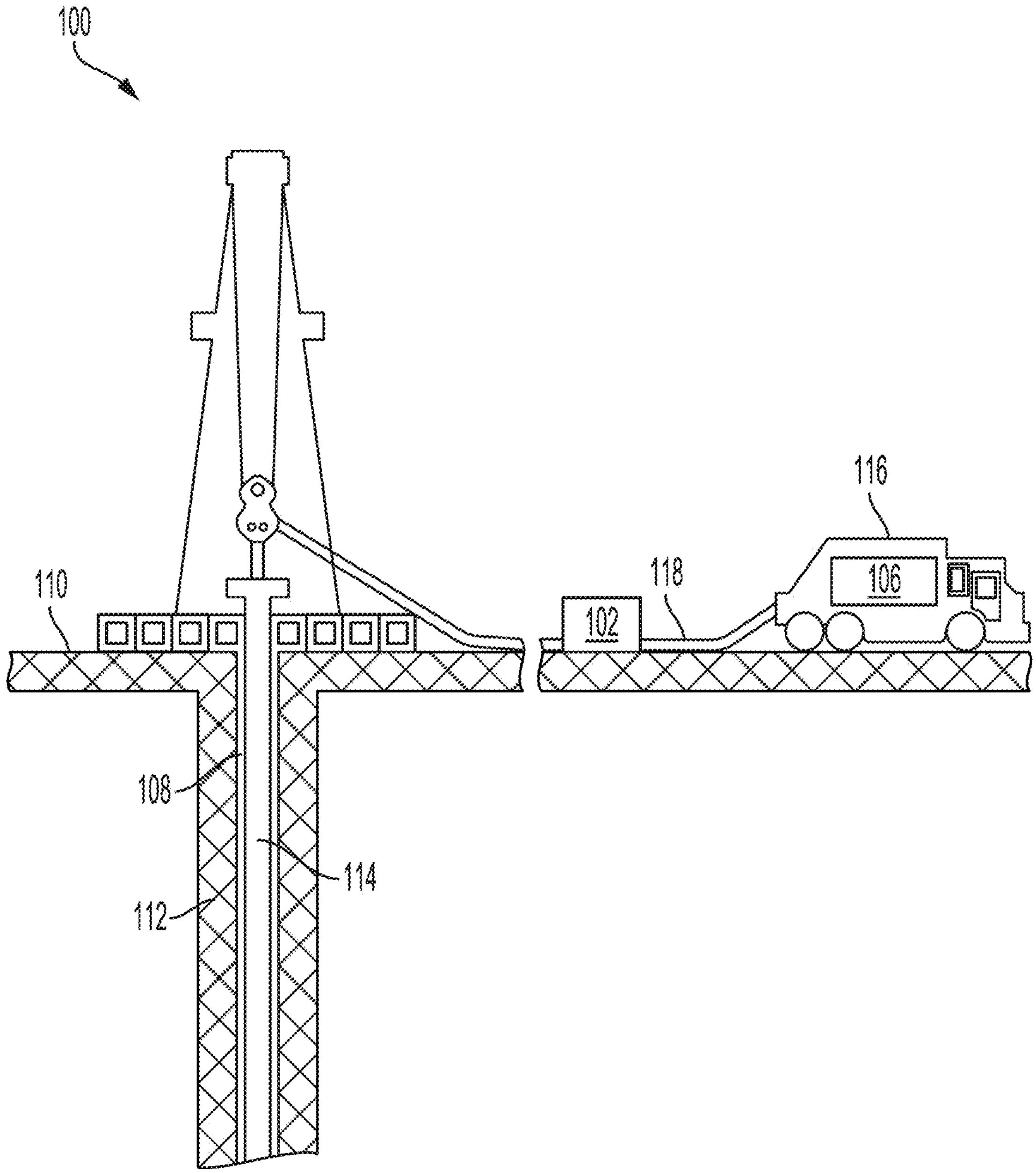
FIG. 1 is a schematic of a wellsite that includes a control system for regulating a gaseous fuel supply to an engine at a wellbore according to one example of the present disclosure.

Certain aspects and examples of the present disclosure relate to a control system for regulating a gaseous fuel supply to an engine at a wellbore. The engine can be used to power equipment used to perform a wellsite operation at the wellsite. To operate at a target performance level, the engine may be supplied with high-quality fuel (e.g., a fuel supply having a relatively narrow range of fuel properties in a predefined range). The control system can include sensors that can monitor the fuel supply for the engine by collecting fuel property measurements, such as pressure, temperature, or water content of the fuel supply. The sensors can be positioned along the fuel supply line upstream of the engine to monitor the fuel supply at various points prior to the fuel supply reaching the engine. Accordingly, the control system can use the fuel property measurements collected by the sensors to monitor the fuel supply and detect if the fuel properties of the fuel supply are outside of the predefined range. If the control system determines that the fuel properties are outside of the predefined range, the control system can modify the fuel supply to the engine such that the engine can use the modified fuel supply to operate at or above the target performance level.

Inconsistent fuel quality of the fuel supply can result in engine derates or shutdowns of the equipment during the wellsite operation. In some instances, the fuel quality of the fuel supply may vary over time or the source of the fuel supply may vary due to different suppliers of the fuel supply. The engine derates can refer to a reduction of an output of the engine due to inadequate operating conditions resulting from the inconsistent fuel quality of the fuel supply. Accordingly, the fuel properties of the fuel supply being outside of the predefined range (e.g., below or above the predefined range) may cause a reduction in the performance of the engine. The control system can enable the engine to operate at the target performance level by ensuring that the fuel properties of the fuel supply are within the predefined range. For example, by measuring the fuel properties of the fuel supply prior to combustion of the fuel supply in the engine, the control system can cause timely adjustments to the fuel supply to improve quality before inconsistent fuel quality affects the engine. This can reduce downtime caused by fuel supply issues or inconsistent fuel quality. Additionally, the control system can monitor the fuel properties of the fuel supply in relatively close proximity to the fuel supply instead of having to transport samples to an off-site laboratory or testing location. The relatively close proximity of the control system can reduce time taken between detecting inconsistent fuel quality and implementing a corrective action (e.g., a mitigation operation) to address the inconsistent fuel quality.

In some examples, the fuel supply can be transported within a fuel supply line (e.g., a pipe system) of the wellsite, for example if the wellsite includes a wellbore that can produce natural gas. In such examples, a portion of the fuel supply may be diverted to a fuel sampling line coupled to the fuel supply line to collect fuel property measurements using the portion of the fuel supply. In some cases, the fuel property measurements may be direct measurements that can be directly collected or measured, for example using sensors. In other cases, the fuel property measurements may be indirect measurements that can be calculated using known parameters, heuristics, the direct measurements, or a combination thereof. Additionally or alternatively, a fuel tank may be used to provide the fuel supply to the engine of the equipment at the wellsite. In some implementations, the fuel tank may be positioned on the equipment to minimize a distance between the engine and the fuel tank. Examples of the engine of the equipment can include a spark reciprocating engine, compression reciprocating engine, turbine engine, or other suitable gas-consuming engines. Examples of the fuels consumed by the engine can include natural gas, diesel, gasoline, hydrogen fuel, propane, or biodiesel. As an example, if the wellsite operation is a hydraulic fracturing operation, the equipment can include hydraulic fracturing trucks and cementing equipment. Other examples of the wellsite operation can include drilling operations or completion operations.

Additionally, the control system can include a computing device (e.g., a data acquisition device) communicatively coupled with the sensors via a wired or wireless connection. The computing device can receive the fuel property measurements of the fuel supply as direct measurements from the sensors (e.g., separately transmitted by individual sensors or as a collective dataset that includes measurements from multiple sensors). Additionally or alternatively, the fuel property measurements may be indirect measurements that are calculated, for example, using the direct measurements. As an example, fuel temperature or fuel pressure may be direct measurements collected by the sensors and can used to estimate or calculate a density of the fuel supply as an indirect measurement. In some instances, the computing device may store the fuel property measurements, for example to monitor the fuel properties of the fuel supply over time.

Additionally, if the control system detects that the fuel property measurement is outside of the predefined range, the control system may output an alert or a notification, enabling an operator to manually control the fuel supply. In some examples, the control system may output the alert or notification to a remote display that the operator can interact with or view. Additionally or alternatively, the operator may interact with the control system using a mobile application or computer application. Thus, the fuel properties of the fuel supply can be improved prior to the engine being shut down or derated on power. Additionally, by automating adjustments to the fuel supply to be within the predefined range, the control system can enable using (e.g., combining) various fuel sources with different fuel properties for the engine with minimal manual operation. Further, the control system may automatically shut off the fuel supply if the inconsistent fuel quality may cause a hazard (e.g., engine damage, an explosion, equipment failure, etc.)

The control system can handle one or more fuel sources that can be used individually or in combination as the fuel supply for the engine. In some examples, if the control system handles more than one fuel source, the control system can enable switching between different fuel sources to maintain performance of equipment running at the wellsite. Additionally, switching fuel sources can enable swapping fuel filters of a fuel source while avoiding interruptions to the wellsite operation by powering the engine using another fuel source.

As an example, the control system can monitor fuel pressure of the fuel supply at several points within the fuel supply line to flag if the fuel pressure is approaching a minimum value or maximum value of the predefined range. In some examples, if the fuel pressure is below the minimum value of the predefined range, the control system may check fuel pressure throughout the fuel supply line to pinpoint where the fuel pressure is being reduced. In other examples, if the fuel pressure is outside of the predefined range, the control system can swap from an existing fuel source to another fuel source having a different set of filters than the existing fuel source. Additionally or alternatively, if the fuel pressure is above the maximum value of the predefined range, the control system may adjust settings of fuel pressure regulators positioned along the fuel supply line to reduce the fuel pressure to be within the predefined range.

As another example, the control system can monitor fuel temperature of the fuel supply at several points throughout the fuel supply line. The fuel temperature being below a minimum value of the predefined range can cause performance issues, damage to the equipment, or a combination thereof. For example, when the fuel temperature is below the minimum value of the predefined range, hydrocarbon liquids or water condensation may form or drop out of the gaseous fuel supply, causing damage to the engine during combustion. The control system can similarly monitor water concentration of the fuel supply to prevent a fuel supply containing a water concentration above a maximum value of the predefined range from entering the engine.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a wellsite 100 that includes a control system 102 for regulating a gaseous fuel supply to an engine 106 at a wellbore 108 according to one example of the present disclosure. The wellsite 100 can include a wellbore 108 extending from a surface 110 of the wellsite 100 through various earth strata. The strata can include different materials (e.g., rock, soil, oil, water, or gas) and can vary in thickness and shape. For example, the wellbore 108 may extend through a subterranean formation 112 bearing natural gas or suitable gaseous fuel. In some examples, the wellsite 100 may include more than one wellbore 108.

A tubing string 114 can extend from the surface 110 into the wellbore 108. The tubing string 114 can provide a conduit for gaseous fuel extracted from the subterranean formation 112 to travel from the subterranean formation 112 to the surface 110. The gaseous fuel can be transported through the tubing string 114 to the surface 110 such that one or more equipment 116 that have a gas-consuming engine 106 can be powered using the gaseous fuel. The equipment 116 may be equipment used during wellbore operations (e.g., drilling operations, fracking operations, or completion operations). In some examples, the gaseous fuel can flow directly from the subterranean formation 112 to the equipment 116 such that the equipment 116 can operate at least in part using the gaseous fuel from the wellbore 108.

Additionally or alternatively, the gaseous fuel can flow from the subterranean formation 112 to the surface 110 and be processed or collected prior to being used as fuel for the equipment 116. In some cases, the gaseous fuel may be stored in a tank or another suitable storage container prior to being used as fuel for the equipment 116. If the gaseous fuel is natural gas, the natural gas may be processed prior to storage to ease transport. For example, the natural gas may be compressed to form compressed natural gas (CNG) or cooled to form liquefied natural gas (LNG).

As another example, the gaseous fuel extracted from the subterranean formation 112 may flow to gas conditioning equipment positioned at the surface 110. The gas conditioning equipment can remove liquids present in the natural gas to avoid engine damage of the equipment 116. In some implementations, a control system 102 can be positioned in a flow path 118 between the gas conditioning equipment and the equipment 116 having a gas-consuming engine 106. This arrangement can enable the control system 102 to prevent damage to the equipment 116 if the gas conditioning equipment fails to remove sufficient liquid from the gaseous fuel. For example, if the control system 102 detects residual liquid present in the gaseous fuel, the control system 102 may shut off the gaseous fuel to prevent the engine 106 from using the gaseous fuel with residual liquid. As another example, the control system 102 may switch to another fuel source to fuel the engine instead of using the gaseous fuel with residual liquid.

The control system 102 may monitor one or more fuel property measurements of the gaseous fuel with respect to a predefined range associated with a target performance level of the engine 106. Examples of the fuel property measurements can include total sulfur content, total halogen content, total ammonia content, temperature, or other suitable parameters of the gaseous fuel. Upon detecting that a fuel property measurement is outside of the predefined range, the control system 102 may modify the fuel supply such that the fuel property measurement of the fuel supply for the engine 106 is within the predefined range. For example, the control system 102 may switch the fuel supply of the engine 106 to another fuel source that has fuel properties within the predefined range. Additionally or alternatively, the control system 102 may use another equipment to modify the fuel supply, for example by using a heater to heat the fuel supply such that a fuel temperature of the fuel supply is within the predefined range.

Figure 2:
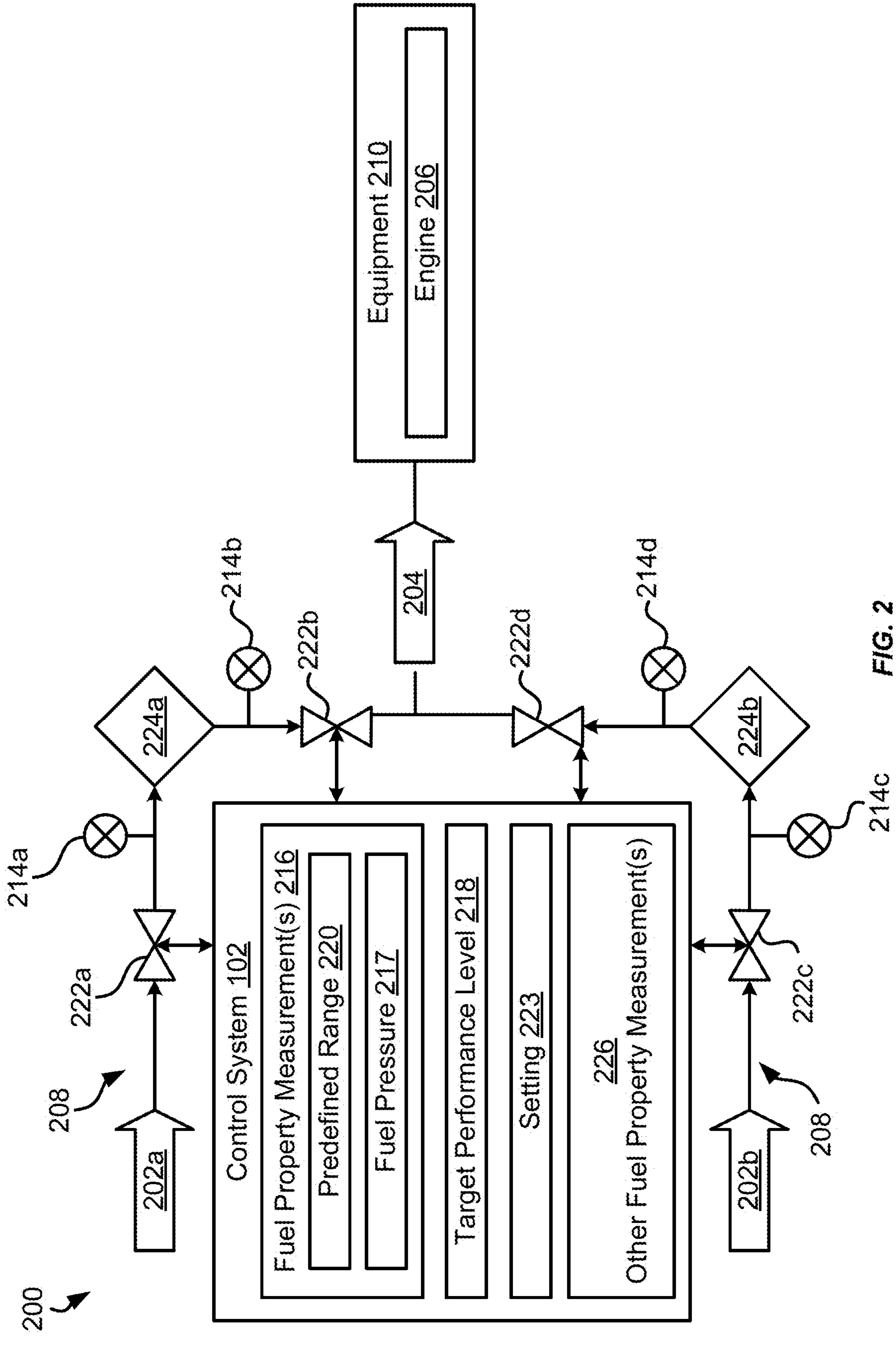
FIG. 2 is a block diagram of an example of a fuel supply line for a gaseous fuel supply to an engine at a wellbore that is regulated by a control system according to one example of the present disclosure.

FIG. 2 is a block diagram of an example 200 of a fuel supply line 208 for a gaseous fuel supply 204 to an engine 206 at a wellbore (e.g., the wellbore 108 of FIG. 1) that is regulated by a control system 102 according to one example of the present disclosure. The control system 102 can be part of a skid that provides a frame on which portable equipment can be mounted to facilitate handling or transportation. The fuel supply 204 can be transported to the engine 206 via the fuel supply line 208 to power the engine 206 and cause an equipment 210 (e.g., the equipment 116 of FIG. 1) to perform an action of a wellsite operation. For example, if the equipment 210 is a blender used to prepare a slurry of a stimulation treatment for a completion operation, the fuel supply 204 may be used to drive the engine 206 of the blender to mix the slurry at a suitable treatment rate. As depicted in FIG. 2, the fuel supply line 208 may be a pipeline used to transport the fuel supply 204 is transported from a first fuel source 202*a* or a second fuel source 202*b* through the fuel supply line 208 to the equipment 210. In some examples, the fuel sources 202*a-b* of the fuel supply 204 may be the wellbore at which the equipment 210 is positioned. Additionally or alternatively, the fuel supply 204 may be stored in a tank or other suitable container at a wellsite (e.g., the wellsite 100 of FIG. 1).

The control system 102 can be communicatively coupled to one or more sensors 214*a-d* that can monitor the fuel supply 204 for the engine 206 by collecting at least one fuel property measurement 216. Examples of the fuel property measurement 216 can include measuring fuel pressure 217, fuel temperature, fuel flow rate, water concentration, energy content, particle size, filter restriction, or filtered liquid content level. Although the sensors 214*a-d* depicted in FIG. 2 are pressure gauges, other types of sensors are possible. For example, the sensors 214*a-d* may include flow sensors to measure a flow rate of the first fuel source 202*a* and the second fuel source 202*b*. Based on the fuel property measurements 216 provided by the sensors 214*a-d*, the control system 102 can identify leaks, deteriorated valve seals, or other malfunctions in the fuel supply line 208. For example, a decrease in pressure (e.g., a pressure drop) of fuel pressure 217 or a decrease in flow rate that exceeds a predefined threshold can indicate a leak in the fuel supply line 208. A deformation (e.g., crack, hole, etc.) of the fuel supply line associated with the leak may cause the pressure decrease due to ambient pressure outside of the fuel supply line being different from the fuel pressure 217 within the fuel supply line. Through a positioning or distribution of the sensors 214*a-d* and the fuel property measurements 216 provided by the sensors 214*a-d*, the control system 102 can pinpoint a location of the malfunction within the fuel supply line 208.

Additionally or alternatively, the control system 102 can use the fuel property measurements 216 to determine whether the first fuel source 202*a* can enable the engine 206 to operate at or above a target performance level 218. The target performance level 218 can correspond to a predefined range 220 of at least one fuel property measurement 216. Subsequent to identifying the predefined range 220 of the engine 206, the control system 102 can determine whether the fuel property measurements 216 of the first fuel source 202*a* is within or outside of the predefined range 220. If at least one fuel property measurement 216 of the first fuel source 202*a* is outside of the predefined range 220, the control system 102 can identify a second fuel source 202*b* to provide to the engine 206 as the fuel supply 204. The control system 102 can identify the second fuel source 202*b* based on determining that fuel properties of the second fuel source 202*b* are within the predefined range 220, enabling the engine 206 to operate at the target performance level 218. For example, the control system 102 may receive one or more other fuel property measurements 226 of the second fuel source 202*b* that are collected by the sensors 214*a-d*. The control system 102 then can compare the other fuel property measurements 226 to the predefined range 220 to determine that the other fuel property measurements 226 of the second fuel source 202*b* are within the predefined range 220.

Additionally, the control system 102 can switch the fuel supply 204 for the engine 206 from the first fuel source 202*a* to the second fuel source 202*b*. In some examples, the control system 102 may continue to monitor the first fuel source 202*a* after switching the fuel supply 204 to the second fuel source 202*b*, for example to monitor an improvement of the first fuel source 202*a* with respect to the fuel property measurement 216. In such examples, the control system 102 may monitor the second fuel source 202*b* to determine whether the fuel property measurement 220 has improved to be within the predefined range 220.

In some examples, the control system 102 can be communicatively coupled to one or more valves 222*a-d* that can be used to regulate the fuel supply 204. The control system 102 can monitor and control a setting 223 (e.g., valve position) of the valves 222*a-d* to automatically switch the fuel supply 204 of the engine 206 from the first fuel source 202*a* to the second fuel source 202*b* to maintain a target performance level 218 of the engine 206. For example, based on a fuel property measurement 216 provided by a first sensor 214*a* and a second sensor 214*b* of the sensors 214*a-d*, the control system 102 can determine a filter failure of a first filter 224*a* of the first fuel source 202*a*. In some examples, as depicted in FIG. 2, the first sensor 214*a* may be positioned upstream of the first filter 224*a* while the second sensor 214*b* may be positioned downstream of the first filter 224*a*. In such examples, the fuel property measurement 216 may be a pressure measurement used to determine a pressure drop across the first filter 224*a* based on pressure measurements collected by the first sensor 214*a* and the second sensor 214*b*. Alternatively, the control system 102 may determine that the first filter 224*a* has failed based on a particle count of particles present in the fuel supply 204 being outside of the predefined range 220. A relatively high particle count can indicate a failed fuel filter and can cause premature wear of the engine 206, leading to component failures of the equipment 210.

In response to determining that the first filter 224*a* has failed, the control system 102 can automatically adjust valve positions of the valves 222*a-d* to switch the fuel supply 204 from the first fuel source 202*a* to the second fuel source 202*b*. The second fuel source 202*b* can include a second filter 224*b* that can maintain a particle count within the predefined range 220. For example, the control system 102 may close a first valve 222*a* and a second valve 222*b* associated with the first fuel source 202*a* after opening a third valve 222*c* and a fourth valve 222*d* associated with the second fuel source 202*b*. Opening the third valve 222*c* and fourth valve 222*d* prior to closing off the first fuel source 202*a* can prevent starving the engine 206 of fuel when switching the fuel supply 204. If the engine 206 is powered by two or more fuel sources (e.g., the first fuel source 202*a* and the second fuel source 202*b*), a fuel source of the fuel sources can be shut off before adding a third fuel source to maintain the target performance level 218 of the engine 206. Once the fuel supply 204 is switched to the second fuel source 202*b*, the failed filter 224*a* of the first fuel source 202*a* can be repaired or replaced with a functional fuel filter. Accordingly, the engine 206 can continue to operate at the target performance level 218 and avoid downtime of the equipment 210 while the first filter 224*a* is being serviced.

Although valves are depicted in FIG. 2, other mechanical devices (e.g., gas regulators, etc.) are possible. In some examples, the fuel supply line 208 may include one or more fuel pressure regulators in place of or in addition to the valves 222*a-d*. Similar to the valves 222*a-d*, the fuel pressure regulators may be communicatively coupled to the control system 102. In such examples, if the control system 102 determines that a fuel pressure 217 of the first fuel source 202*a* is above the predefined range 220, the control system 102 can modify a setting 223 of the fuel pressure regulators to decrease the fuel pressure 217. As an example, modifying the setting 223 of the fuel pressure regulators may involve relieving the fuel pressure 217 by venting a portion of the first fuel source 202*a*.

Figure 3:
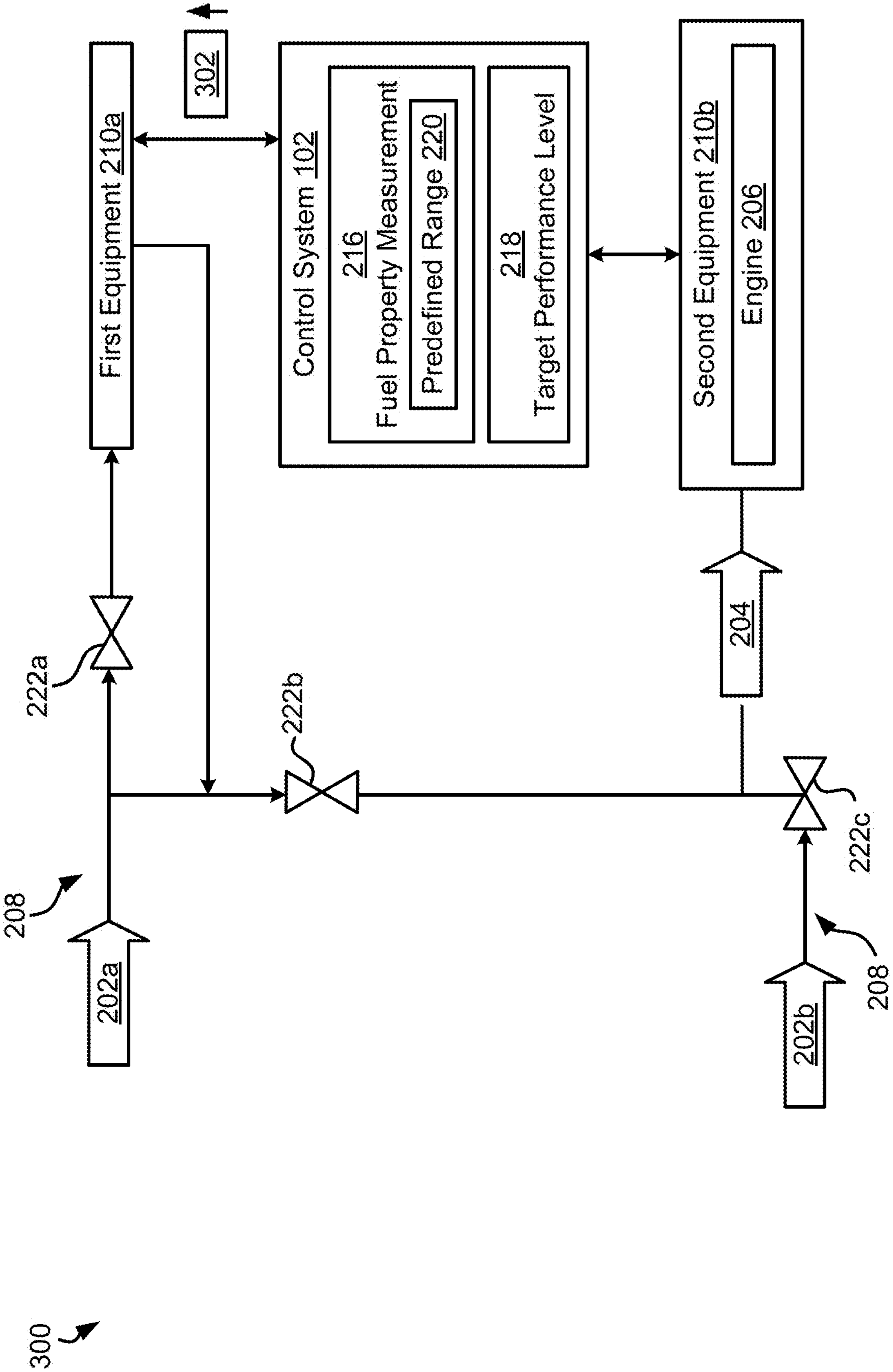
FIG. 3 is a block diagram of another example of a fuel supply line for a gaseous fuel supply to an engine at a wellbore that is regulated by a control system according to one example of the present disclosure.

FIG. 3 is a block diagram of another example of a fuel supply line 208 for a gaseous fuel supply 204 to an engine 206 at a wellbore (e.g., the wellbore 108 of FIG. 1) that is regulated by a control system 102 according to one example of the present disclosure. The control system 102 may implement a fuel blending process in response to determining that a first fuel source 202*a* is outside of a predefined range 220. As a result, an engine 206 using the first fuel source 202*a* as the fuel supply may operate below a target performance level 218. The fuel blending process can involve blending the first fuel source 202*a* with a second fuel source 202*b* to create a blended fuel supply 204 having fuel properties within the predefined range 220. The blended fuel supply 204 can enable the engine 206 to operate at the target performance level 218. In some examples, the control system 102 may identify the second fuel source 202*b* to combine with the first fuel source 202*a* to create the blended fuel supply 204. Identifying the second fuel supply 204*b* may involve determining whether certain physical properties (e.g., density, miscibility, combustibility, etc.) of the second fuel source 202*b* are compatible with physical properties of the first fuel source 202*a*. Once the control system 102 identifies the second fuel source 202*b*, the control system 102 may calculate an amount (e.g., a volume) of the second fuel source 202*b* to combine with the first fuel source 202*a*, for example to reach a particular molar gas fraction.

In some implementations, the second fuel source 202*b* may be injected or otherwise combined into the fuel supply line 208 that is used to transport the first fuel supply 204*a*. For example, the control system 102 may open a third valve 222*c* associated with the second fuel source 202*b* to add the second fuel source 202*b* into the fuel supply line 208. By adding the second fuel source 202*b* into the fuel supply line 208, the first fuel source 202*a* and the second fuel source 202*b* can mix to form the blended fuel supply 204. Additionally or alternatively, the first fuel source 202*a* and the second fuel source 202*b* may be combined using specialized equipment (e.g., a mixer) to ensure that the blended fuel supply 204 is well-mixed (e.g., homogenous).

Additionally or alternatively, after determining that the fuel property measurement 216 is outside of the predefined range 220, the control system 102 may transmit a communication 302 to a first equipment 210*a* communicatively coupled to the control system 102. Once the first equipment 210*a* receives the communication 302 from the control system 102, the first equipment 210*a* can perform a mitigation operation to improve the first fuel source 202*a*. The mitigation operation can modify the first fuel source 202*a* such that the fuel property measurement or other suitable fuel properties is within the predefined range 220. As a result, the engine 206 can use the first fuel source 202*a* as the fuel supply 204 to power a second equipment 210*b* to operate at the target performance level 218. Examples of the mitigation operation may include heating or cooling the fuel supply 204, regulating fuel pressure, performing gas conditioning, or other suitable operations to improve fuel properties of the first fuel source 202*a*. For example, the first equipment 210*a* may be a gas conditioning skid used to remove liquid components and solid contaminants from the first fuel source 202*a*. In some examples, the control system 102 may transmit the communication 302 to more than one equipment 210, for example to regulate fuel temperature and to remove solid contaminants.

If the control system determines that the mitigation operation is to be performed, the control system 102 can automatically adjust settings of the valves 222*a-c* to coordinate a flow path of the fuel supply 204 through the fuel supply line 208. For example, the control system 102 may open a first valve 222 upstream of the first equipment 210*a* to enable the first equipment to perform the mitigation operation for the first fuel source 202*a*. Once the first equipment 210*a* completes the mitigation operation for the first fuel source 202*a*, the control system 102 can close the first valve 222*a* and open a second valve 222*b* to enable the first fuel source 202*a* to flow to the second equipment 210*b*. The engine 206 of the second equipment 210*b* then can use the mitigated first fuel source 202*a* to power the second equipment 210*b* to perform a wellsite operation (e.g., a completion operation, drilling operation, etc.).

Figure 4:
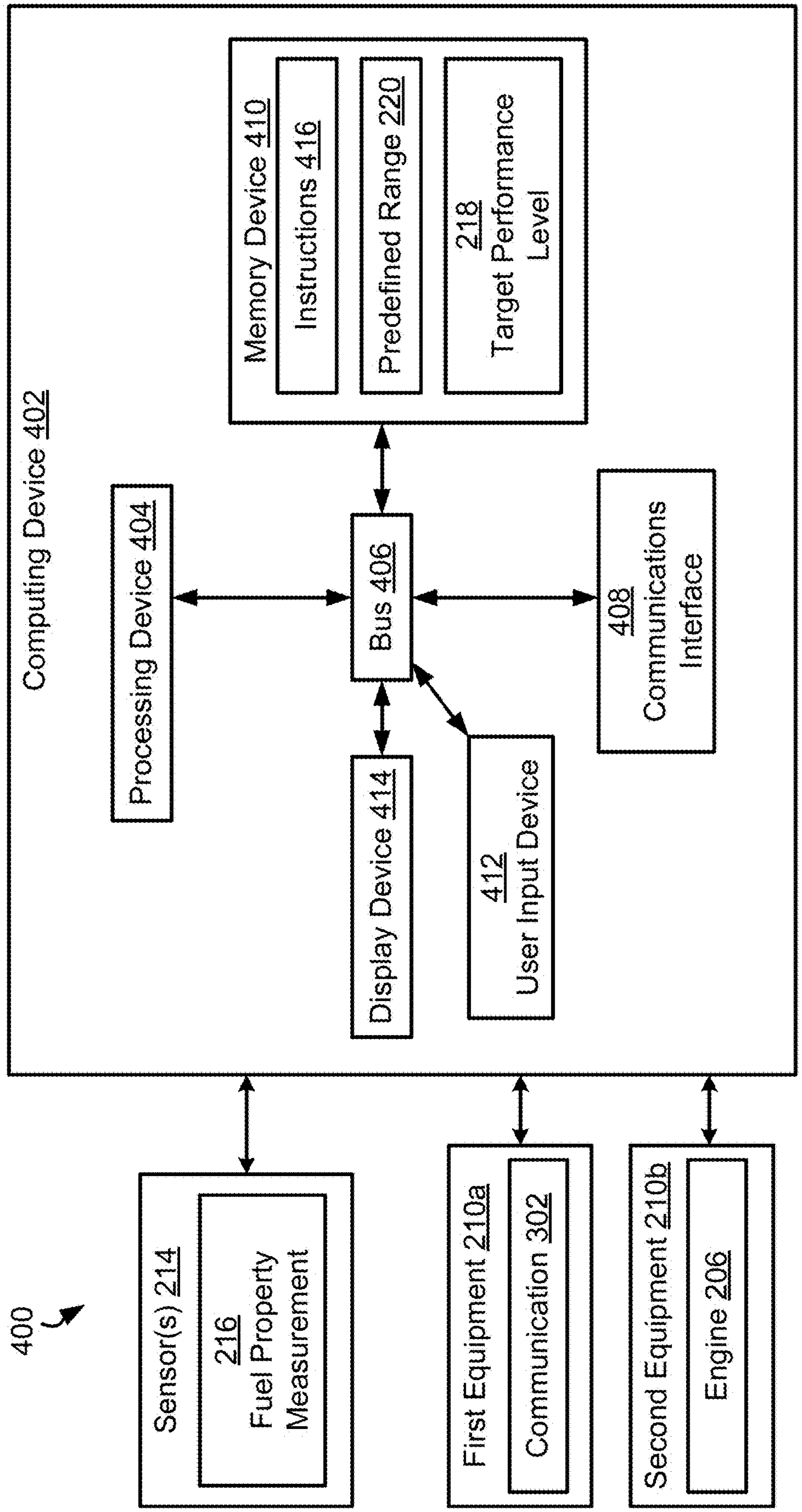
FIG. 4 is a block diagram of a computing device for regulating a gaseous fuel supply to an engine at a wellbore according to one example of the present disclosure.

FIG. 4 is a block diagram 400 of a computing device 402 for regulating a gaseous fuel supply (e.g., the fuel supply 204 of FIG. 2) to an engine 206 at a wellbore (e.g., the wellbore 108 of FIG. 1) according to one example of the present disclosure. In some examples, the gaseous fuel supply can be the gaseous fuel supply supplied to an engine used to power equipment, as depicted in FIGS. 2-3. The computing device 402 can be part of a control system (e.g., the control system 102 of FIGS. 1-3) that can regulate the fuel supply to the engine 206. The computing device 402 includes a processing device 404, a bus 406, a communication interface 408, a memory device 410, a user input device 412, and a display device 414. In some examples, some or all components shown in FIG. 4 can be integrated into a single structure, such as a single housing. In other examples, some or all of the components shown in FIG. 4 can be distributed (e.g., in separate housings) and in communication with each other. The processing device 404 can execute one or more operations to monitor the fuel supply for the engine 206 of the equipment 210 depicted in FIG. 1. The processing device 404 can execute instructions 416 stored in the memory device 410 to perform the operations. The processing device 404 can include one processing device or multiple processing devices. Non-limiting examples of the processing device 404 include a field-programmable gate array (FPGA), an application-specific integrated circuit (ASIC), a processor, a microprocessing device, etc.

The processing device 404 depicted in FIG. 4 is communicatively coupled to the memory device 410 via the bus 406. The non-transitory memory device 410 may include any type of memory device that retains stored information when powered off. The stored information can include historical fuel property measurements, for example to calculate trends in the fuel property measurements over a period of time or to establish a baseline of the fuel property measurements. Non-limiting examples of the memory device 410 include electrically erasable and programmable read-only memory (EEPROM), flash memory, or any other type of non-volatile memory. In some examples, at least some of the memory device 410 can include a non-transitory computer-readable medium from which the processing device 404 can read instructions 416. A computer-readable medium can include electronic, optical, magnetic, or other storage devices capable of providing the processing device 404 with computer-readable instructions or other program code. Non-limiting examples of a computer-readable medium include (but are not limited to) magnetic disk(s), memory chip(s), read-only memory (ROM), random access memory (RAM), an ASIC, a configured processing device, optical storage, or any other medium from which a computer processing device can read instructions 416. The instructions 416 can include processing device-specific instructions generated by a compiler or an interpreter from code written in any suitable computer-programming language, including, for example, C, C++, C#, etc.

In some examples, the computing device 402 includes a communication interface 408. The communication interface 408 can represent one or more components that facilitate a network connection or otherwise facilitate communication between electronic devices. Examples include, but are not limited to, wired interfaces such as Ethernet, USB, IEEE 1394, or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network). The computing device 402 can be communicatively coupled to the sensors 214*a-d* or other devices (e.g., the valves 222*a-d* of FIG. 2) via the communication interface 408.

In some examples, the computing device 402 includes a user input device 412. The user input device 412 can represent one or more components used to input data or adjust settings of the computing device 402. Examples of the user input device 412 can include a keyboard, mouse, touchpad, button, or touch-screen display. In some examples, the computing device 402 includes a display device 414. Examples of the display device 414 can include a liquid-crystal display (LCD), a television, a computer monitor, or a touch-screen display. The display device 414 may output a pop-up notification, text message, audio signal, or warning lights to alert an operator regarding the fuel property measurement 216 being outside of the predefined range 220. In some examples, the user input device 412 and the display device 414 can be a single device, such as a touch-screen display.

The computing device 402 can receive one or more measurements with respect to at least one fuel property measurement 216 of the fuel supply from one or more sensors 214*a-d*. The measurements can be transmitted as electric signals to the computing device 402. Based on the measurements received from the sensors 214*a*-d, the processing device 404 of the computing device 402 can determine whether the fuel property measurement 216 of the fuel supply is outside of a predefined range 220. If the fuel property measurement 216 is within the predefined range 220, the engine 206 can use the fuel supply to operate at a target performance level 218. Alternatively, if the fuel property measurement 216 is outside of the predefined range 220, the engine 206 may perform at a lower performance level than the target performance level 218. For example, if the engine 206 is used to power a blender used to prepare a slurry of a stimulation treatment, the target performance level 218 can be associated with a homogeneity of the slurry. If the fuel property measurement 216 is outside of the predefined range 220, the engine 206 may be unable to provide sufficient power for the blender to homogenize the slurry.

If the processing device 404 determines that the fuel property measurement 216 is outside of the predefined range 220, the processing device 404 can implement a mitigation operation to improve the fuel supply. For example, the processing device 404 may transmit a communication 302 to a first equipment 210*a* to have the first equipment 210*a* perform the mitigation operation to improve one or more fuel properties of the fuel supply. In some cases, the first equipment 210*a* may be a heat exchanger used to improve the fuel temperature of the fuel supply by either heating or cooling the fuel supply such that the fuel temperature is within the predefined range. For instance, heating the fuel supply to be within the predefined range 220 may prevent the fuel supply from gelling, thereby avoid relatively low fuel pressure and loss of performance. Once the first equipment 210*a* performs the mitigation operation, the processing device 404 can adjust flow regulators (e.g., the valves 222*a-c* of FIG. 3) to direct the mitigated fuel supply to a second equipment 210*b* that includes the engine 206.

Figure 5:
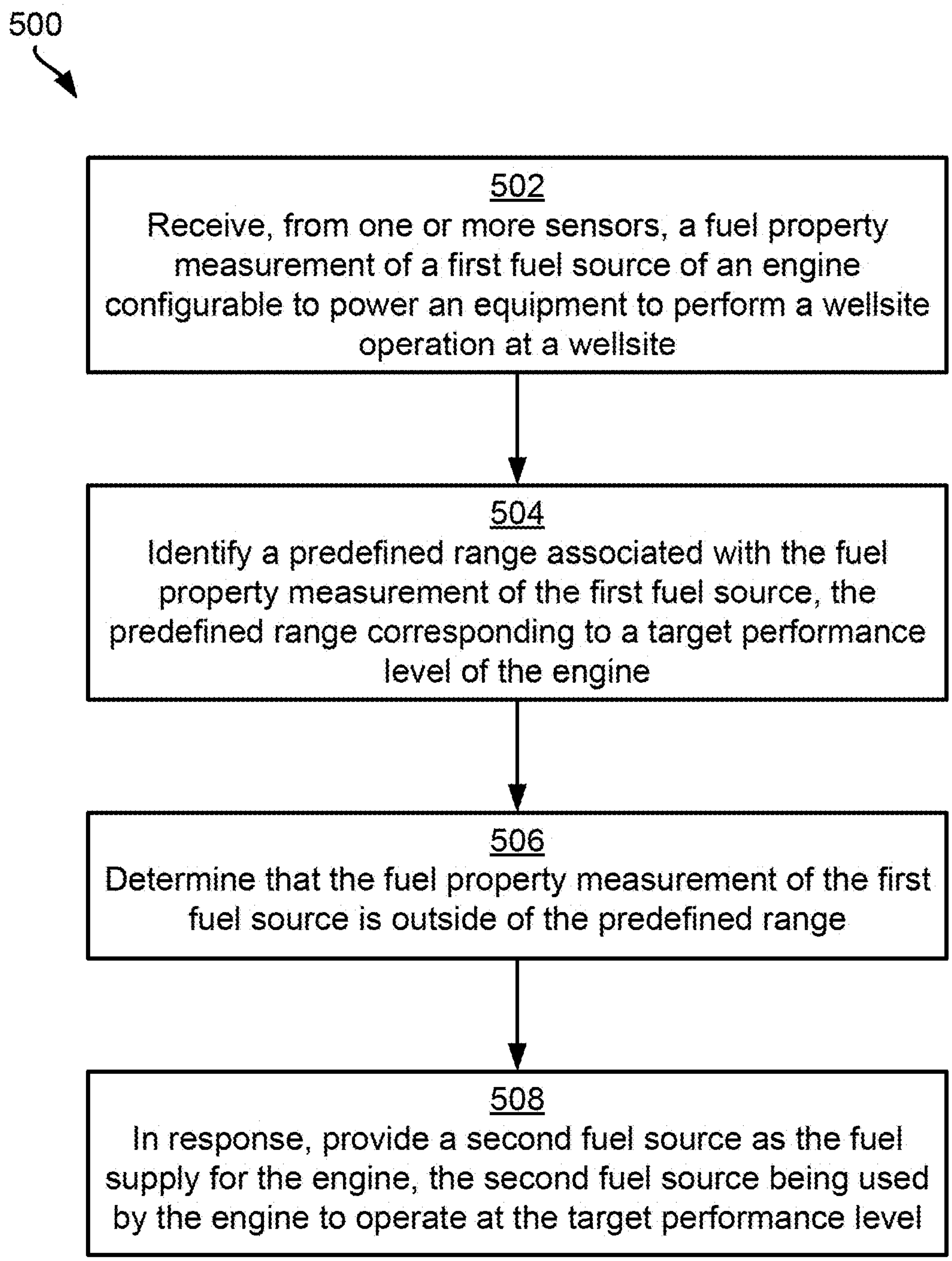
FIG. 5 is a flowchart of a process for regulating a gaseous fuel supply to an engine at a wellbore according to one example of the present disclosure.

FIG. 5 is a flowchart of a process 500 for regulating a gaseous fuel supply 204 to an engine 206 at a wellbore 108 according to one example of the present disclosure. While FIG. 5 depicts a certain sequence of steps for illustrative purposes, other examples can involve more steps, fewer steps, different steps, or a different order of steps depicted in FIG. 5. The process 500 is described with reference to components shown in FIGS. 1-4.

At block 502, the processing device 404 receives, from one or more sensors 214*a-d* communicatively coupled to the processing device 404, a fuel property measurement 216 of a first fuel source 202*a* of an engine 206. The engine 206 can power an equipment 210 to perform a wellsite operation (e.g., a drilling or completion operation) at a wellsite 100 using the first fuel source 202*a* as a fuel supply 204. The sensors 214*a-d* may monitor the fuel supply 204 for the engine 206 by measuring the fuel property measurement 216 of a first fuel source 202*a* or a second fuel source 202*b*. In some examples, the processing device 404 can receive a set of measurements (e.g., temperature, composition, etc.) collected by the sensors 214*a-d* to monitor the fuel property measurement 216 of the fuel supply 204. Using the set of measurements, the processing device 404 can calculate or estimate the fuel property measurement 216 of the fuel supply 204. For example, gas chromatography data collected by the sensors 214*a-d* can be used to identify a chemical composition of the fuel supply 204, such as a total hydrocarbon content or a total water content.

At block 504, the processing device 404 identifies a predefined range 220 associated with the fuel property measurement 216 of the first fuel source 202*a*. The predefined range 220 can correspond to a target performance level 218 of the engine 206. The predefined range 220 may vary depending on a type of the engine 206, for example whether the engine 206 runs on diesel, natural gas, or a combination thereof. A list or table of one or more predefined ranges 220 may be stored in the memory device 410 communicatively coupled to the processing device 404.

At block 506, the processing device 404 determines that the fuel property measurement 216 of the first fuel source 202*a* is outside of the predefined range 220. In some examples, the processing device 404 may use the predefined range 220 of the fuel supply 204 stored in the memory device 410 to compare with the fuel property measurement 216. The processing device 404 then can determine whether the fuel property measurement 216 is outside of the predefined range 220. For example, the processing device 404 may compare an energy content of the first fuel source 202*a* with the predefined range 220 to determine that the energy content of the first fuel source 202*a* is outside of the predefined range 220. The energy content of the first fuel source 202*a* being outside of the predefined range 220 may cause the engine 206 to not meet emissions limits set by local or federal regulations. In some examples, the processing device 404 may generate an alert (e.g., a notification or warning) to notify an operator that the fuel property measurement 216 is outside of the predefined range 220.

At block 508, in response to determining that the fuel property measurement 216 is outside of the predefined range 220, the processing device 404 provides a second fuel source 202*b* as the fuel supply 204 for the engine 206. The second fuel source 202*b* can be used by the engine 206 to operate at the target performance level 218 associated with the engine 206. The processing device 404 can provide the second fuel source 202*b* by adjusting valves 222*a-d* or other suitable flow regulators of the fuel supply line 208 to shut off the first fuel source 202*a* and direct the second fuel source 202*b* to the engine 206. Alternatively, the processing device 404 may determine that the second fuel source 202*b* can be mixed with the first fuel source 202*a* to produce a blended fuel supply 204 exhibiting fuel properties that are within the predefined range 220. The processing device 404 then can combine the first fuel source 202*a* with the second fuel source 202*b* in the fuel supply line 208 to provide the blended fuel supply to the engine 206.

In some aspects, a system, method, non-transitory computer-readable medium for regulating a gaseous fuel supply to an engine at a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a control system comprising: an engine of an equipment configurable to perform a wellsite operation at a wellsite; one or more sensors configurable to monitor a first fuel source and a second fuel source usable as a fuel supply for the engine; a processing device communicatively couplable to the one or more sensors; and a memory device that includes instructions executable by the processing device for causing the processing device to perform operations comprising: receiving, from the one or more sensors, a fuel property measurement of the first fuel source of the engine; identifying a predefined range associated with the fuel property measurement of the first fuel source, the predefined range corresponding to a target performance level of the engine; determining that the fuel property measurement of the first fuel source is outside of the predefined range; and in response to determining that the fuel property measurement of the first fuel source is outside of the predefined range, providing the second fuel source as the fuel supply for the engine, the second fuel source being usable by the engine to operate at the target performance level.

Example 2 is the control system of example(s) 1, wherein the operations further comprise: identifying that the second fuel source is combinable with the first fuel source to create a blended fuel supply, wherein the blended fuel supply exhibits fuel properties within the predefined range; and creating the blended fuel supply by combining the first fuel source and the second fuel source, wherein providing the second fuel source as the fuel supply further comprises providing the blended fuel supply as the fuel supply for the engine.

Example 3 is the control system of example(s) 1-2, wherein the operations further comprise: receiving, from the one or more sensors, one or more other fuel property measurements of the second fuel source of the engine; and determining, based on the one or more other fuel property measurements, that the second fuel source is within the predefined range, wherein, providing the second fuel source as the fuel supply further comprises switching from the first fuel source to the second fuel source.

Example 4 is the control system of example(s) 1-3, wherein the fuel property measurement is a particle count, and wherein the operations further comprise: determining that the particle count of the first fuel source is outside of the predefined range; subsequent to determining that the particle count of the first fuel source is outside of the predefined range, identifying a filter failure of the first fuel source; and in response to identifying the filter failure of the first fuel source, identifying the second fuel source usable to replace the first fuel source, wherein providing the second fuel source as the fuel supply further comprises switching the fuel supply of the engine from the first fuel source to the second fuel source.

Example 5 is the control system of example(s) 1-4, wherein the fuel property measurement is a pressure decrease, and wherein the operations further comprise: detecting the pressure decrease in the first fuel source; determining that the pressure decrease is outside of the predefined range; and subsequent to determining that the pressure decrease is outside of the predefined range, identifying the second fuel source, wherein providing the second fuel source as the fuel supply further comprises switching the fuel supply of the engine from the first fuel source to the second fuel source.

Example 6 is the control system of example(s) 1-5, wherein the operations further comprise, in response to determining that the fuel property measurement of the first fuel source is outside of the predefined range: transmitting a communication to at least one other equipment positioned at the wellsite, wherein, in response to receiving the communication, the at least one other equipment is configurable to modify the first fuel source to be within the predefined range based on the communication.

Example 7 is the control system of example(s) 1-6, wherein the fuel property measurement is a fuel pressure, and wherein the operations further comprise: determining that the fuel pressure of the first fuel source is above the predefined range; and in response to determining that the fuel pressure of the first fuel source is above the predefined range, modifying a setting of a fuel pressure regulator to decrease the fuel pressure of the first fuel source, wherein the fuel pressure regulator is communicatively couplable to the processing device.

Example 8 is the control system of example(s) 1-7, wherein the fuel property measurement of the first fuel source comprises at least one direct measurement or indirect measurement of: a flow rate, water concentration, particle size, pressure, filter restriction, energy content, temperature, or filtered liquid content level.

Example 9 is a method comprising: receiving, by a processing device and from one or more sensors communicatively couplable to the processing device, a fuel property measurement of a first fuel source of an engine configurable to power an equipment to perform a wellsite operation at a wellsite, the first fuel source usable as a fuel supply for the engine; identifying, by the processing device a predefined range associated with the fuel property measurement of the first fuel source, the predefined range corresponding to a target performance level of the engine; determining, by the processing device, that the fuel property measurement of the first fuel source is outside of the predefined range; and in response to determining that the fuel property measurement of the first fuel source is outside of the predefined range, providing, by the processing device, a second fuel source as the fuel supply for the engine, the second fuel source being usable by the engine to operate at the target performance level.

Example 10 is the method of example(s) 9, wherein the method further comprise: identifying that the second fuel source is combinable with the first fuel source to create a blended fuel supply, wherein the blended fuel supply exhibits its fuel properties within the predefined range; and creating the blended fuel supply by combining the first fuel source and the second fuel source, wherein providing the second fuel source as the fuel supply further comprises providing the blended fuel supply as the fuel supply for the engine.

Example 11 is the method of example(s) 9-10, wherein the method further comprises: receiving, from the one or more sensors, one or more other fuel property measurements of the second fuel source of the engine; and determining, based on the one or more other fuel property measurements, that the second fuel source is within the predefined range, wherein, providing the second fuel source as the fuel supply further comprises switching from the first fuel source to the second fuel source as the fuel supply for the engine.

Example 12 is the method of example(s) 9-11, wherein the fuel property measurement is a particle count, and wherein the method further comprises: determining that the particle count of the first fuel source is outside of the predefined range; subsequent to determining that the particle count of the first fuel source is outside of the predefined range, identifying a filter failure of the first fuel source; and in response to identifying the filter failure of the first fuel source, identifying the second fuel source usable to replace the first fuel source, wherein providing the second fuel source as the fuel supply further comprises switching the fuel supply of the engine from the first fuel source to the second fuel source.

Example 13 is the method of example(s) 9-12, wherein the fuel property measurement is a pressure decrease, and wherein the method further comprises: detecting the pressure decrease in the first fuel source; determining that the pressure decrease is outside of the predefined range; and subsequent to determining that the pressure decrease is outside the predefined range, identifying the second fuel source, wherein providing the second fuel source as the fuel supply further comprises switching the fuel supply of the engine from the first fuel source to the second fuel source.

Example 14 is the method of example(s) 9-13, wherein the method further comprises, in response to determining that the fuel property measurement of the first fuel source is outside of the predefined range: transmitting a communication to at least one other equipment positioned at the wellsite, wherein, in response to receiving the communication, the at least one other equipment is configurable to modify the first fuel source to be within the predefined range based on the communication.

Example 15 is the method of example(s) 9-14, wherein the fuel property measurement is a fuel pressure, and wherein the method further comprises: determining that the fuel pressure of the first fuel source is above the predefined range, wherein the fuel pressure is the fuel property measurement; and in response to determining that the fuel pressure of the first fuel source is above the predefined range, modifying a setting of a fuel pressure regulator to decrease the fuel pressure of the first fuel source, wherein the fuel pressure regulator is communicatively couplable to the processing device.

Example 16 is the method of example(s) 9-15, wherein the fuel property measurement of the first fuel source comprises at least one direct measurement or indirect measurement of: a flow rate, water concentration, particle size, pressure, filter restriction, energy content, temperature, or filtered liquid content level.

Example 17 is a non-transitory computer-readable medium comprising instructions that are executable by a processing device for causing the processing device to perform operations comprising: receiving, from one or more sensors communicatively couplable to the processing device, a fuel property measurement of a first fuel source of an engine configurable to power an equipment to perform a wellsite operation at a wellsite, the first fuel source usable as a fuel supply for the engine; identifying a predefined range associated with the fuel property measurement of the first fuel source, the predefined range corresponding to a target performance level of the engine; determining that the fuel property measurement of the first fuel source is outside of the predefined range; and in response to determining that the fuel property measurement of the first fuel source is outside of the predefined range, providing a second fuel source as the fuel supply for the engine, the second fuel source being usable by the engine to operate at the target performance level.

Example 18 is the non-transitory computer-readable medium of example(s) 17, wherein the operations further comprise: identifying that the second fuel source is combinable with the first fuel source to create a blended fuel supply, wherein the blended fuel supply exhibits fuel properties within the predefined range; and creating the blended fuel supply by combining the first fuel source and the second fuel source, wherein providing the second fuel source as the fuel supply further comprises providing the blended fuel supply as the fuel supply for the engine.

Example 19 is the non-transitory computer-readable medium of example(s) 17-18, wherein the operations further comprise: receiving, from the one or more sensors, one or more other fuel property measurements of the second fuel source of the engine; and determining, based on the one or more other fuel property measurements, that the second fuel source is within the predefined range, wherein providing the second fuel source as the fuel supply further comprises switching from the first fuel source to the second fuel source.

Example 20 is the non-transitory computer-readable medium of example(s) 17-19, wherein the fuel property measurement of the first fuel source comprises at least one direct measurement or indirect measurement of: a flow rate, water concentration, particle size, pressure, filter restriction, energy content, temperature, or filtered liquid content level.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A control system comprising:

an engine of an equipment configurable to perform a wellsite operation at a wellsite;

one or more sensors configurable to monitor a first fuel source and a second fuel source usable as a fuel supply for the engine;

a processing device communicatively couplable to the one or more sensors; and a memory device that includes instructions executable by the processing device for causing the processing device to perform operations comprising:

receiving, from the one or more sensors, a fuel property measurement of the first fuel source of the engine;

identifying a predefined range associated with the fuel property measurement of the first fuel source, the predefined range corresponding to a target performance level of the engine;

determining that the fuel property measurement of the first fuel source is outside of the predefined range;

in response to determining that the fuel property measurement of the first fuel source is outside of the predefined range, determining whether to perform a mitigation operation to modify the first fuel source to be within the predefined range such that the first fuel source is providable as the fuel supply for the engine to operate at the target performance level;

based on determining to perform the mitigation operation, transmitting a communication to at least one other equipment positioned at the wellsite, wherein, in response to receiving the communication, the at least one other equipment is configurable to modify the first fuel source to be within the predefined range based on the communication; and based on determining to forgo the mitigation operation, providing the second fuel source as the fuel supply for the engine, the second fuel source being usable by the engine to operate at the target performance level.

2. The control system of claim 1, wherein the operations further comprise:

identifying that the second fuel source is combinable with the first fuel source to create a blended fuel supply, wherein the blended fuel supply exhibits fuel properties within the predefined range; and creating the blended fuel supply by combining the first fuel source and the second fuel source, wherein providing the second fuel source as the fuel supply further comprises providing the blended fuel supply as the fuel supply for the engine.

3. The control system of claim 1, wherein the operations further comprise:

receiving, from the one or more sensors, one or more other fuel property measurements of the second fuel source of the engine; and determining, based on the one or more other fuel property measurements, that the second fuel source is within the predefined range, wherein, providing the second fuel source as the fuel supply further comprises switching from the first fuel source to the second fuel source.

4. The control system of claim 1, wherein the fuel property measurement is a particle count, and wherein the operations further comprise:

determining that the particle count of the first fuel source is outside of the predefined range;

subsequent to determining that the particle count of the first fuel source is outside of the predefined range, identifying a filter failure of the first fuel source; and in response to identifying the filter failure of the first fuel source, identifying the second fuel source usable to replace the first fuel source, wherein providing the second fuel source as the fuel supply further comprises switching the fuel supply of the engine from the first fuel source to the second fuel source.

5. The control system of claim 1, wherein the fuel property measurement is a pressure decrease, and wherein the operations further comprise:

detecting the pressure decrease in the first fuel source;

determining that the pressure decrease is outside of the predefined range; and subsequent to determining that the pressure decrease is outside of the predefined range, identifying the second fuel source, wherein providing the second fuel source as the fuel supply further comprises switching the fuel supply of the engine from the first fuel source to the second fuel source.

6. The control system of claim 1, wherein the fuel property measurement is a fuel pressure, and wherein the operations further comprise:

determining that the fuel pressure of the first fuel source is above the predefined range; and in response to determining that the fuel pressure of the first fuel source is above the predefined range, modifying a setting of a fuel pressure regulator to decrease the fuel pressure of the first fuel source, wherein the fuel pressure regulator is communicatively couplable to the processing device.

7. The control system of claim 1, wherein the fuel property measurement of the first fuel source comprises at least one direct measurement or indirect measurement of: a flow rate, water concentration, particle size, pressure, filter restriction, energy content, temperature, or filtered liquid content level.

8. A method comprising:

receiving, by a processing device and from one or more sensors communicatively couplable to the processing device, a fuel property measurement of a first fuel source of an engine configurable to power an equipment to perform a wellsite operation at a wellsite, the first fuel source usable as a fuel supply for the engine;

identifying, by the processing device a predefined range associated with the fuel property measurement of the first fuel source, the predefined range corresponding to a target performance level of the engine;

determining, by the processing device, that the fuel property measurement of the first fuel source is outside of the predefined range;

in response to determining that the fuel property measurement of the first fuel source is outside of the predefined range, determining whether to perform a mitigation operation to modify the first fuel source to be within the predefined range such that the first fuel source is providable as the fuel supply for the engine to operate at the target performance level;

based on determining to perform the mitigation operation, transmitting a communication to at least one other equipment positioned at the wellsite, wherein, in response to receiving the communication, the at least one other equipment is configurable to modify the first fuel source to be within the predefined range based on the communication; and based on determining to forgo the mitigation operation, providing, by the processing device, a second fuel source as the fuel supply for the engine, the second fuel source being usable by the engine to operate at the target performance level.

9. The method of claim 8, wherein the method further comprise:

identifying that the second fuel source is combinable with the first fuel source to create a blended fuel supply, wherein the blended fuel supply exhibits fuel properties within the predefined range; and creating the blended fuel supply by combining the first fuel source and the second fuel source, wherein providing the second fuel source as the fuel supply further comprises providing the blended fuel supply as the fuel supply for the engine.

10. The method of claim 8, wherein the method further comprises:

receiving, from the one or more sensors, one or more other fuel property measurements of the second fuel source of the engine; and determining, based on the one or more other fuel property measurements, that the second fuel source is within the predefined range, wherein, providing the second fuel source as the fuel supply further comprises switching from the first fuel source to the second fuel source as the fuel supply for the engine.

11. The method of claim 8, wherein the fuel property measurement is a particle count, and wherein the method further comprises:

determining that the particle count of the first fuel source is outside of the predefined range;

subsequent to determining that the particle count of the first fuel source is outside of the predefined range, identifying a filter failure of the first fuel source; and in response to identifying the filter failure of the first fuel source, identifying the second fuel source usable to replace the first fuel source, wherein providing the second fuel source as the fuel supply further comprises switching the fuel supply of the engine from the first fuel source to the second fuel source.

12. The method of claim 8, wherein the fuel property measurement is a pressure decrease, and wherein the method further comprises:

detecting the pressure decrease in the first fuel source;

determining that the pressure decrease is outside of the predefined range; and subsequent to determining that the pressure decrease is outside the predefined range, identifying the second fuel source, wherein providing the second fuel source as the fuel supply further comprises switching the fuel supply of the engine from the first fuel source to the second fuel source.

13. The method of claim 8, wherein the fuel property measurement is a fuel pressure, and wherein the method further comprises:

determining that the fuel pressure of the first fuel source is above the predefined range, wherein the fuel pressure is the fuel property measurement; and in response to determining that the fuel pressure of the first fuel source is above the predefined range, modifying a setting of a fuel pressure regulator to decrease the fuel pressure of the first fuel source, wherein the fuel pressure regulator is communicatively couplable to the processing device.

14. The method of claim 8, wherein the fuel property measurement of the first fuel source comprises at least one direct measurement or indirect measurement of: a flow rate, water concentration, particle size, pressure, filter restriction, energy content, temperature, or filtered liquid content level.

15. A non-transitory computer-readable medium comprising instructions that are executable by a processing device for causing the processing device to perform operations comprising:

receiving, from one or more sensors communicatively couplable to the processing device, a fuel property measurement of a first fuel source of an engine configurable to power an equipment to perform a wellsite operation at a wellsite, the first fuel source usable as a fuel supply for the engine;

identifying a predefined range associated with the fuel property measurement of the first fuel source, the predefined range corresponding to a target performance level of the engine;

determining that the fuel property measurement of the first fuel source is outside of the predefined range in response to determining that the fuel property measurement of the first fuel source is outside of the predefined range, determining whether to perform a mitigation operation to modify the first fuel source to be within the predefined range such that the first fuel source is providable as the fuel supply for the engine to operate at the target performance level;

based on determining to perform the mitigation operation, transmitting a communication to at least one other equipment positioned at the wellsite, wherein, in response to receiving the communication, the at least one other equipment is configurable to modify the first fuel source to be within the predefined range based on the communication; and based on determining to forgo the mitigation operation, providing a second fuel source as the fuel supply for the engine, the second fuel source being usable by the engine to operate at the target performance level.

16. The non-transitory computer-readable medium of claim 15, wherein the operations further comprise:

identifying that the second fuel source is combinable with the first fuel source to create a blended fuel supply, wherein the blended fuel supply exhibits fuel properties within the predefined range; and creating the blended fuel supply by combining the first fuel source and the second fuel source, wherein providing the second fuel source as the fuel supply further comprises providing the blended fuel supply as the fuel supply for the engine.

17. The non-transitory computer-readable medium of claim 15, wherein the operations further comprise:

receiving, from the one or more sensors, one or more other fuel property measurements of the second fuel source of the engine; and determining, based on the one or more other fuel property measurements, that the second fuel source is within the predefined range, wherein providing the second fuel source as the fuel supply further comprises switching from the first fuel source to the second fuel source.

18. The non-transitory computer-readable medium of claim 15, wherein the fuel property measurement of the first fuel source comprises at least one direct measurement or indirect measurement of: a flow rate, water concentration, particle size, pressure, filter restriction, energy content, temperature, or filtered liquid content level.

* * * * *